United States Patent
Davydov et al.

(10) Patent No.: US 9,210,592 B2
(45) Date of Patent: Dec. 8, 2015

(54) COORDINATED MULTIPOINT (COMP) INTERFERENCE NOISE ESTIMATION

(75) Inventors: Alexei Vladimirovich Davydov, Nizhny Novgorod (RU); Gregory Vladimirovich Morozov, Nizhny Novgorod (RU); Alexander Alexandrovich Maltsev, Nizhny Novgorod (RU); Ilya Alexandrovich Bolotin, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 108 days.

(21) Appl. No.: 13/994,742

(22) PCT Filed: Dec. 22, 2011

(86) PCT No.: PCT/RU2011/001021
§ 371 (c)(1),
(2), (4) Date: Sep. 6, 2013

(87) PCT Pub. No.: WO2012/093953
PCT Pub. Date: Jul. 12, 2012

(65) Prior Publication Data
US 2013/0344909 A1 Dec. 26, 2013

Related U.S. Application Data

(60) Provisional application No. 61/430,879, filed on Jan. 7, 2011.

(51) Int. Cl.
*H04B 7/00* (2006.01)
*H04W 24/02* (2009.01)
(Continued)

(52) U.S. Cl.
CPC ............ *H04W 24/02* (2013.01); *H04B 7/0689* (2013.01); *H04L 1/003* (2013.01); *H04L 5/0023* (2013.01);
(Continued)

(58) Field of Classification Search
USPC .............. 455/562.1, 69, 561, 63.1, 63.2, 446, 455/422.1, 450–453, 456.2, 464, 509, 510, 455/114.2, 296; 370/395.41, 332; 375/E7.141
See application file for complete search history.

(56) References Cited

U.S. PATENT DOCUMENTS 5,886,988 A * 3/1999 Yun et al. ................. 370/329
2006/0285585 A1* 12/2006 Sampath .................. 375/227
(Continued)

FOREIGN PATENT DOCUMENTS

CN 101789815 A 7/2010
CN 101867457 A 10/2010
(Continued)

OTHER PUBLICATIONS

Motolora, "CSI-RS Pattern Evaluation and Muting Consideration", 3GPP TSG RAN1 #60 bis, R1-102148, Beijing, China, Apr. 12-16, 2010, 4 pages.
(Continued)

*Primary Examiner* — Dominic E Rego
(74) *Attorney, Agent, or Firm* — Thorpe North & Western LLP

(57) ABSTRACT

A noise and interference estimator and method for estimating noise and interference in a coordinated multipoint (CoMP) system at a mobile communication device is disclosed. The method comprises the operation of receiving a channel state information reference signal (CSI-RS) from a serving transmitting station at a user equipment (UE). Resource elements (REs) occupied by the CSI-RS of the serving transmitting station are muted on cooperating transmitting stations in the CoMP system. The operation of estimating a non-cooperating interference noise covariance matrix from the CSI-RS transmitted by the serving transmitting station follows.

20 Claims, 14 Drawing Sheets

(51) Int. Cl.
*H04B 7/06* (2006.01)
*H04L 5/00* (2006.01)
*H04L 1/00* (2006.01)
*H04L 1/18* (2006.01)
*H04L 25/03* (2006.01)
*H04W 24/00* (2009.01)
*H04W 72/00* (2009.01)
*H04W 72/04* (2009.01)
*H04W 88/08* (2009.01)

(52) U.S. Cl.
CPC ............ *H04L 5/0035* (2013.01); *H04L 5/0048* (2013.01); *H04L 5/0057* (2013.01); *H04L 1/0026* (2013.01); *H04L 1/1861* (2013.01); *H04L 5/0073* (2013.01); *H04L 25/03949* (2013.01); *H04W 24/00* (2013.01); *H04W 72/00* (2013.01); *H04W 72/04* (2013.01); *H04W 88/08* (2013.01)

(56) References Cited

U.S. PATENT DOCUMENTS

| | | | | |
|---|---|---|---|---|
| 2007/0164902 | A1* | 7/2007 | Bang et al. ................... | 342/377 |
| 2008/0165875 | A1 | 7/2008 | Mundarath et al. | |
| 2010/0323720 | A1 | 12/2010 | Jen | |
| 2011/0009150 | A1* | 1/2011 | Cairns ........................... | 455/522 |
| 2011/0064035 | A1* | 3/2011 | Guerreiro et al. ............. | 370/329 |
| 2011/0199986 | A1* | 8/2011 | Fong et al. ..................... | 370/329 |
| 2012/0099544 | A1* | 4/2012 | Pajukoski et al. .............. | 370/329 |

FOREIGN PATENT DOCUMENTS

| | | |
|---|---|---|
| WO | 2012/093953 A2 | 7/2012 |
| WO | 2012/093953 A3 | 11/2012 |

OTHER PUBLICATIONS

L.G. Electronics, "Muting aspects and Intercell CSI-RS design", TSG-RAN WGI Meeting #61, R1-102698, Montreal, Canada, May 10-14, 2010, 6 Pages.

ZTE, "Investigation on CSI-RS Muting", 3GPPTSG RAN WGI Meeting # 61 bis, R1-103587, Dresden, Germany, Jun. 28-Jul. 2, 2010, pp. 1-8.

NTT DOCOMO, "Throughput Performance Evaluation of RE Muting for Inter-cell CSI-RS", R1-105433, 3GPP TSG RAN WG1 Meeting # 62, Xian, China, Oct. 11-15, 2010, pp. 1-12.

CATT, "Interference Measurement over Muted RE", 3GPP TSG RAN WG1 Meeting # 63, R1-105922, Jacksonville, USA, Nov. 15-19, 2010, 4 pages.

International Preliminary Report on Patentability received for PCT application No. PCT/RU2011/001021, mailed on Jul. 18, 2013, 11 pages.

International Search Report and Written Opinion received for PCT application No. PCT/RU2011/001021, mailed on Sep. 14, 2012, 16 pages.

ZTE, "CSI-RS Muting Evaluation", 3GPP TSG RAN WG1 R1-102900, May 2010, pp. 7, Meeting #61, Agenda # 6.3.2.2, ZTE, Montreal, Canada.

Office Action received for Chinese Application No. 201180069061.8 dated Apr. 20, 2015, 9 pages.

\* cited by examiner

COORDINATED MULTIPOINT (COMP) INTERFERENCE NOISE ESTIMATION

RELATED APPLICATIONS

This application claims the benefit of and hereby incorporates by reference U.S. Provisional Patent Application Ser. No. 61/430,879, filed Jan. 7, 2011.

BACKGROUND

Wireless mobile communication technology uses various standards and protocols to transmit data between a base transceiver station (BTS) and a wireless mobile device. Some wireless devices communicate using an orthogonal frequency-division multiplexing (OFDM) digital modulation scheme via a physical layer. OFDM standards and protocols can include the third generation partnership project (3GPP) long term evolution (LTE), the Institute of Electrical and Electronics Engineers (IEEE) 802.16 standard (e.g., 802.16e, 802.16m), which is commonly known to industry groups as WiMax (Worldwide interoperability for Microwave Access), and the IEEE 802.11 standard, which is commonly known to industry groups as WiFi. In 3GPP radio access networks (RANs) in LTE systems, the BTS can be a combination of evolved Node Bs (also commonly denoted as enhanced Node Bs, eNode Bs, or eNBs) and Radio Network Controllers (RNCs) in a Universal Terrestrial Radio Access Network (UTRAN), which communicates with the wireless mobile device, known as a user equipment (UE). Both the BTS and wireless mobile device can transmit and receive data. The transmitting station (Transmitter or Tx) can transmit data via a signal on a channel to a receiving station (Receiver or Rx), where a channel uses a specified frequency bandwidth. The transmitted signal on the channel from the transmitter can vary from the received signal at the receiver due to noise and interference. Estimating the effects of the channel in an OFDM signal can improve data transmission between wireless devices. The BTS can be grouped together with other BTSs in a Coordinated MultiPoint (CoMP) system where BTSs from multiple cells can transmit signals to the mobile communication device and receive signals from the mobile communication device.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
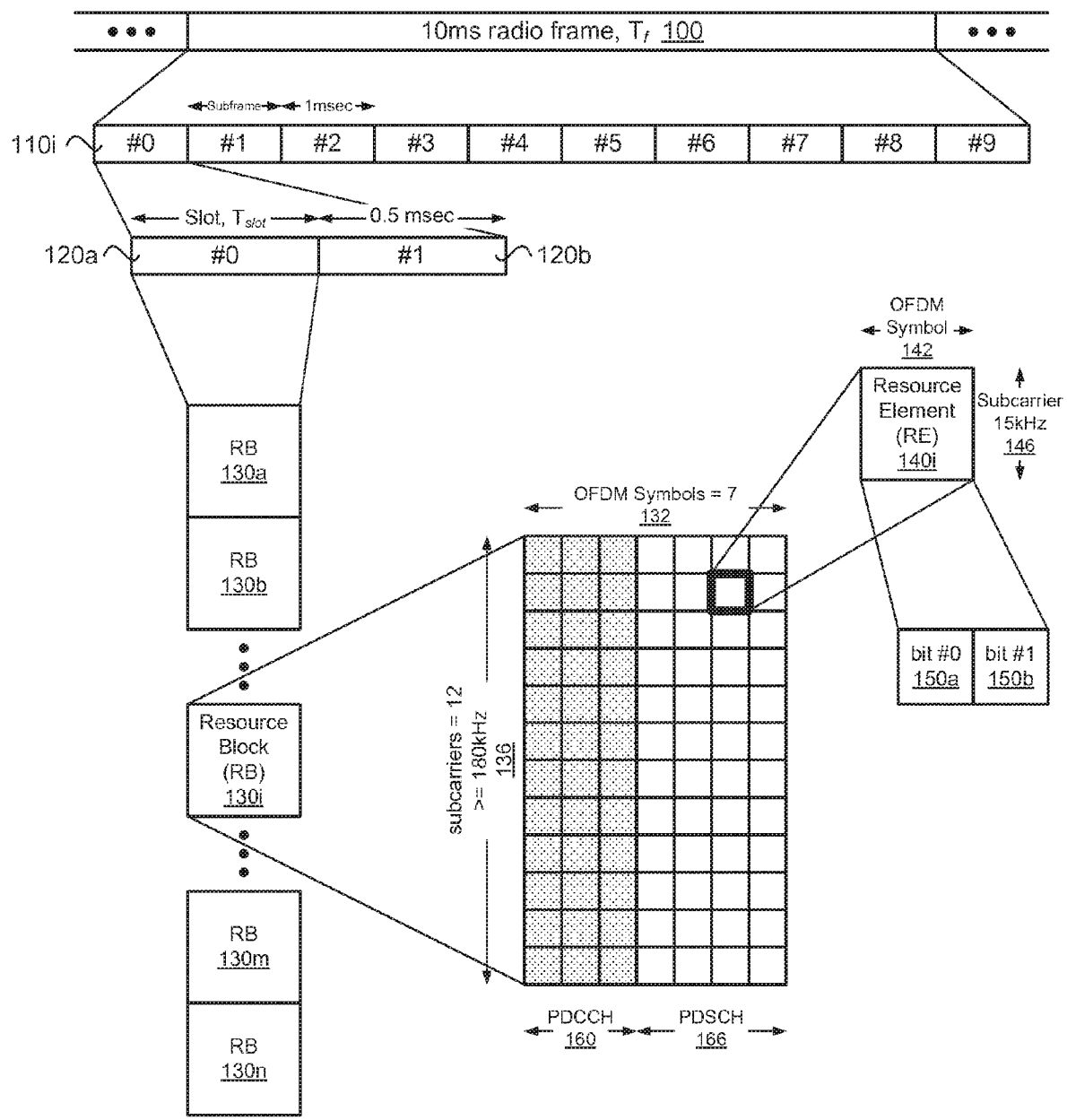
FIG. 1 illustrates a block diagram of radio frame resources in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. The term matrix and vector may be used interchangeably. A matrix (plural matrices) can be a rectangular array of numbers, symbols, or expressions. A vector (or vector space) can be a mathematical structure formed by a collection of vectors: objects that may be added together and multiplied ("scaled") by numbers, called scalars.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A non-cooperating interference noise covariance matrix can be generated directly using channel-state information reference signals (CSI-RSs) with coordinated muting of resource elements (REs) of cooperating transmitting stations in a Coordinated MultiPoint (CoMP) system, or generated indirectly using cell-specific reference signal (CRS) and channel matrices for each cooperating transmitting station in the CoMP system where the channel matrices can be measured using CSI-RS.

In an example of direct non-cooperating noise and interference estimation, the noise and interference estimator calculates the interference noise covariance matrix $\hat{R}_{ni}^{out}$ based on the CSI-RS with coordinated muting of the cooperating evolved NodeB (eNB) (or remote radio equipments [RREs]) on the REs occupied by CSI-RS. The serving eNB (or RRE) is not muted during the measurement of the CSI-RS. Thus after subtracting a product of a channel estimate of a serving eNB (or RRE) $\hat{h}$ and a transmitted CSI-RS $r_{csi}$ from signal y, the noise that remains provides the non-cooperative interference noise covariance matrix $\hat{R}_{ni}^{out}$ that represents the desired interference noise from the non-cooperating eNB's. The direct non-cooperative interference noise covariance matrix $\hat{R}_{ni}^{out}$ can be represented by $\hat{R}_{ni}^{out} = E\{(y - \hat{h} \cdot r_{csi})(y - \hat{h} \cdot r_{csi})^H\}$.

In an example of indirect non-cooperating noise and interference estimation, the noise and interference estimator calculates the total interference noise covariance matrix $\hat{R}_{ni}^{total}$ (including cooperating eNBs) using CRS. The channel matrices $g_k$ for each cooperating eNB can be measured using CSI-RS. A power ratio of CSI-RS to CRS for each cooperating eNB, $\lambda_k$, can be calculated at the eNB and sent to the UE. The $\lambda_k$ with the channel matrix $g_k$ for each eNB can be summed together and subtracted from the total interference noise covariance matrix $\hat{R}_{ni}^{total}$ providing the noncooperative interference noise covariance matrix $\hat{R}_{ni}^{out}$. The indirect non-cooperative interference noise covariance matrix $\hat{R}_{ni}^{out}$ can be represented by $$\hat{R}_{ni}^{out} = E\{(y - \hat{h} \cdot r)(y - \hat{h} \cdot r)^H\} - \sum_k \lambda_k \cdot g_k g_k^H.$$

In one example, data in wireless mobile communications can be transmitted on the physical (PHY) layer by the transmitting station (Transmitter or Tx) to the receiving station (Receiver or Rx) using a generic long term evolution (LTE) frame structure, as illustrated in FIG. 1. While an LTE frame structure is illustrated, a frame structure for an IEEE 802.16 standard (WiMax), an IEEE 802.11 standard (WiFi), or another type of communication standard using OFDM may also be used.

In the example illustrated in FIG. 1, a radio frame 100 of a signal used to transmit the data can be configured to have a duration, $T_f$, of 10 milliseconds (ms). Each radio frame can be segmented or divided into ten subframes 110i that are each 1 ms long. Each subframe can be further subdivided into two slots 120a and 120b, each with a duration, $T_{slot}$, of 0.5 ms. The first slot (#0) 120a can include a physical downlink control channel (POOCH) 160 and a physical downlink shared channel (PDSCH) 166, and the second slot (#1) 120b can include data using the PDSCH. Each slot for a component carrier (CC) used by the transmitting station and the receiving station can include multiple resource blocks (RBs) 130a, 130b, 130i, 130m, and 130n based on the CC frequency bandwidth. Each RB (physical RB or PRB) 130i can include 12-15 kHz sub-carriers 136 (on the frequency axis) and 6 or 7 orthogonal frequency-division multiplexing (OFDM) symbols 132 (on the time axis) per subcarrier. The RB can use seven OFDM symbols if a short or normal cyclic prefix is employed. The RB can use six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits 150a and 150b of information in the case of quadrature phase-shift keying (QPSK) modulation. Other types of modulation, such as 16 quadrature amplitude modulation (QAM) or 64 QAM, may be used to transmit a greater number of bits in each RE. The RB can be configured for a downlink transmission from the eNode B to the UE, or the RB can be configured for an uplink transmission from the UE to the eNode B.

Figure 2A:
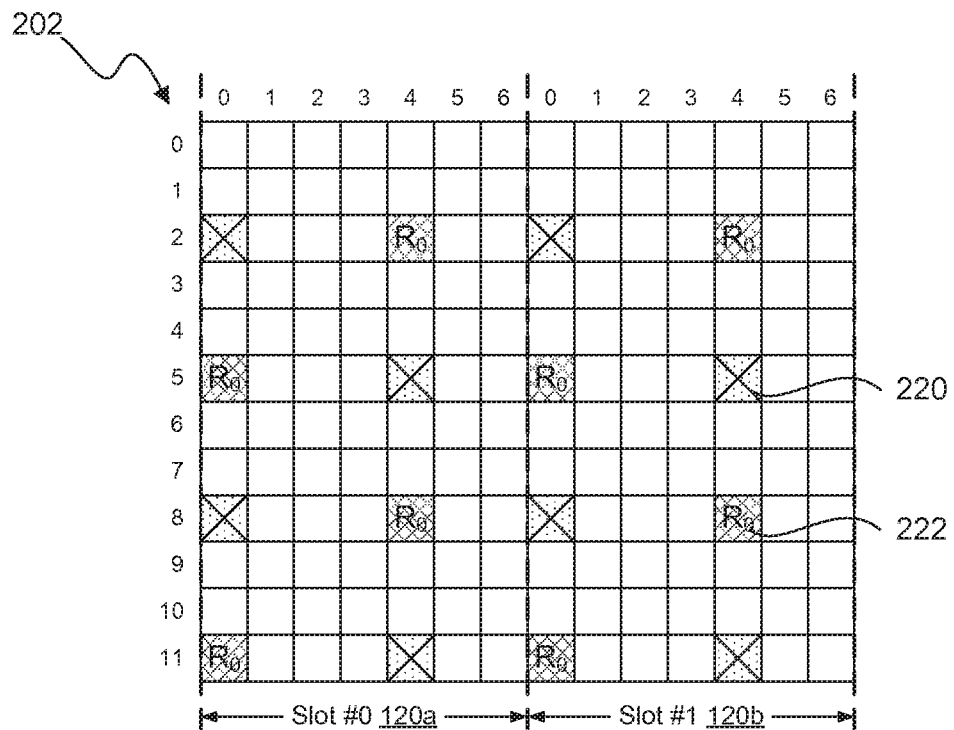
FIG. 2A illustrates a block diagram of cell-specific reference signals (CRS) in a resource block (RB) for antenna port 0 in a two antenna port wireless transceiver in accordance with an example.
Figure 2B:
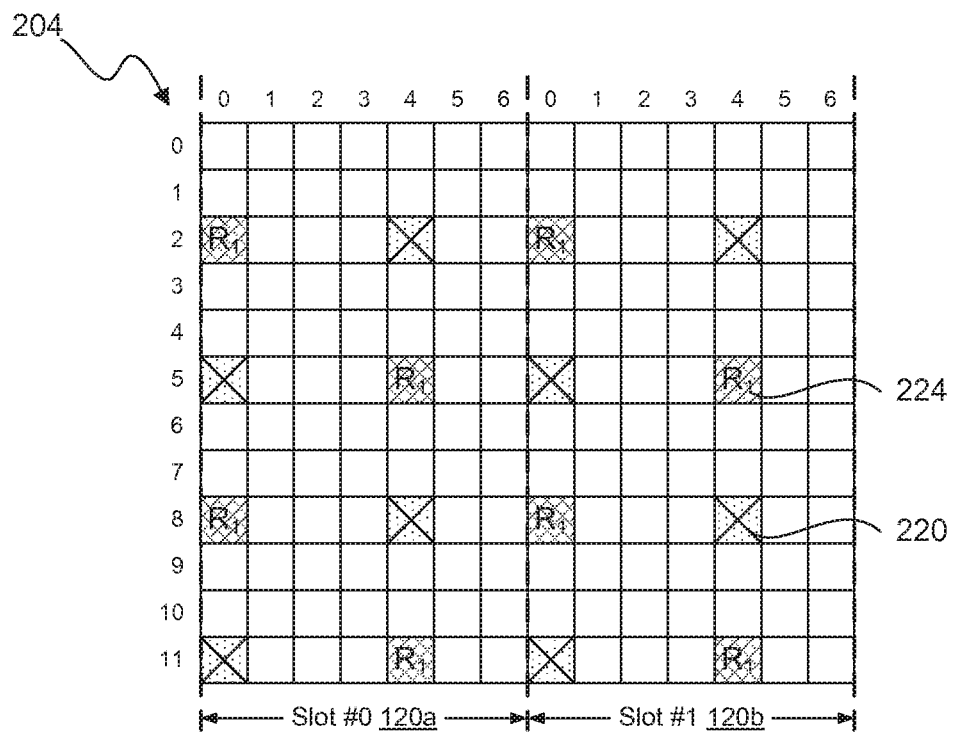
FIG. 2B illustrates a block diagram of cell-specific reference signals (CRS) in a resource block (RB) for antenna port 1 in a two antenna port wireless transceiver in accordance with an example.

Reference signals can be transmitted by OFDM symbols via resource elements in the resource blocks. Reference signals (or pilot signals or tones) can be a known signal used to estimate a channel and/or noise in the channel. Reference signals can be received and transmitted by transmitting stations and mobile communication devices. Different types of reference signals (RS) can be used in a RB. For example, in LTE systems, downlink reference signal types can include a cell-specific reference signal (CRS), a multicast\broadcast single-frequency network (MBSFN) reference signal, a UE-specific reference signal (UE-RS) or a demodulation reference signal (DMRS), positioning reference signal (PRS), and a channel-state information reference signal (CSI-RS). FIG. 2A illustrates a RB 202 with CRS for antenna port 0 in a two antenna port wireless transceiver. As illustrated in FIG. 2A, the RB may include CRS REs (cell-specific reference signal OFDM symbols) used for transmitting CRSs for a specific antenna port (antenna port 0) and unused REs (unused OFDM symbols) 220 not used for transmission on the specific port, which allow other antenna ports to transmit their reference signals. FIG. 2B illustrates the CRS REs 224 in a RB 204 used for transmitting CRSs for antenna port 1, which can be located in the REs with the same frequency-domain index and time-domain index as unused REs for antenna port 0. So, the CRSs of antenna port 0 are transmitted on the REs with the same frequency-domain index and time-domain index as unused REs for antenna port 1, and the CRSs of antenna port 1 are transmitted on the REs with the same frequency-domain index and time-domain index as unused REs for antenna port 0. The number of reference signal REs and unused REs used in the RB can depend on the number of antenna ports and type of reference signal being transmitted.

The CRS can be transmitted on antenna ports 0 and 1 for transmitter with two or mode antennas. CRS can be transmitted in downlink subframes in a cell supporting a physical downlink shared channel (PDSCH). Data is transmitted from an eNode B to a UE via a PDSCH. A physical downlink control channel (PDCCH) is used to transfer downlink control information (DCI) that informs the UE about resource allocations or scheduling related to downlink resource assignments on the PDSCH, uplink resource grants, and uplink power control commands. The PDCCH can be transmitted prior to the PDSCH in each subframe transmitted from the eNode B to the UE.

The channel-state information reference signal (CSI-RS) can be transmitted on antenna ports 15 to 22 and can be used for downlink channel estimation in downlink channel state information measurements.

Figure 3:
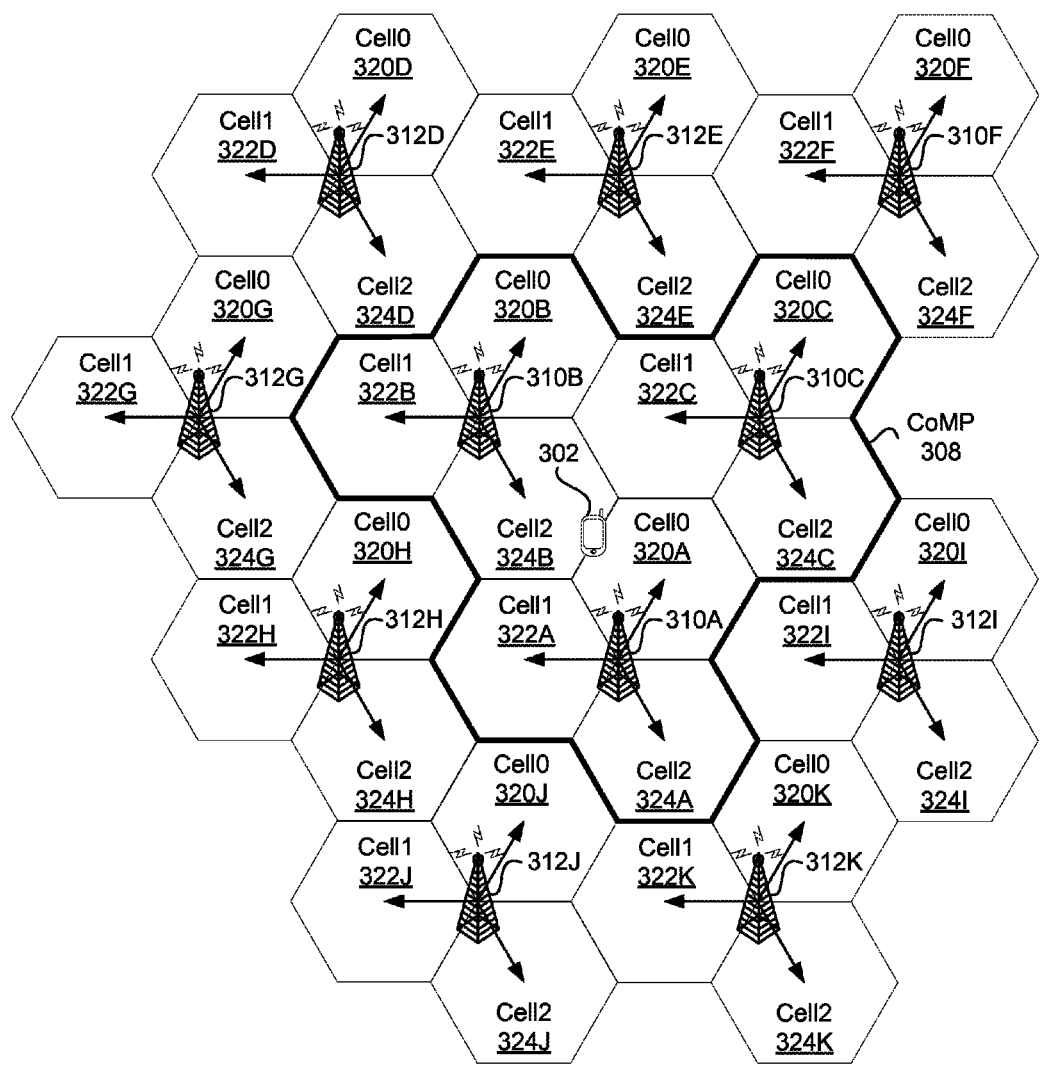
FIG. 3 illustrates a block diagram of an inter-site coordinated multipoint (CoMP) system with non-cooperating transmitting stations in accordance with an example.

Both CRSs and CSI-RSs can be used in a Coordinated MultiPoint (CoMP) system (also known as multi-BS multiple input multiple output [MIMO]) to provide noise and interference estimation. FIG. 3 illustrates an example of an inter-site CoMP system 308. The CoMP system in FIG. 3 is illustrated as a plurality of cooperating transmitting stations (outlined with a bold line) surrounded by a plurality of non-cooperating transmitting stations. In a CoMP system, the transmitting stations can be grouped together as cooperating transmitting stations 310A-C in adjacent cells, where the cooperating transmitting stations from multiple cells can transmit signals to the mobile communication device 302 and receive signals from the mobile communication device, as illustrated in FIG. 3 for an inter-site CoMP system 308. The transmitting station can include a BTS, a base station (BS), an eNode B, a relay station (RS), a remote radio unit (RRU), a remote radio equipment (RRE), and so forth. The mobile communication device can include at least a UE or a mobile station (MS). The BTS, BS, or eNode B can provide signaling over an optical fiber or wired transmission path or connection to an RS, RRU, or RRE. The BTS, BS, or eNode B can provide signaling over an optical fiber or a wired transmission path or connection to other BTSs, BSs, or eNode Bs. Each transmitting station can serve multiple cells (or sectors) 320A-K, 322A-K, and 324A-K. The cell can be a logical definition generated by the transmitting station or geographic transmission area or sub-area (within a total coverage area) covered by the transmitting station, which can include a specific cell identification (ID) that defines the parameters for the cell, such as control channels, reference signals, and component carriers (CC) frequencies. By coordinating transmission among multiple cells, interference from other cells can be reduced and the received power of the desired signal can be increased. The cooperating transmitting stations can coordinate transmission/reception of signals from/to the mobile communication device. The transmitting stations outside the CoMP system can be non-cooperating transmitting stations 312D-K.

Downlink CoMP transmission can be divided into two categories: coordinated scheduling or coordinated beamforming (CS/CB or CS/CBF), and joint processing or joint transmission (JP/JT). With CS/CB, a given subframe can be transmitted from one cell to a given mobile communication device (UE), and the scheduling, including coordinated beamforming, is dynamically coordinated between the cells in order to control and/or reduce the interference between different transmissions. For joint processing, joint transmission can be performed by multiple cells to a mobile communication device (UE), in which multiple transmitting stations transmit at the same time using the same time and frequency radio resources and dynamic cell selection. Two methods can be used for joint transmission: non-coherent transmission, which uses soft-combining reception of the OFDM signal; and coherent transmission, which performs precoding between cells for in-phase combining at the receiver. By coordinating and combining signals from multiple antennas, CoMP, allows mobile users to enjoy consistent performance and quality for high-bandwidth services whether the mobile user is close to the center of a cell or at the outer edges of the cell.

In both a CoMP system and non-CoMP system, the CSI-RS can be used for noise and interference estimation by the mobile communication device (or wireless device). In a CoMP system, each cooperating transmitting station can transmit CSI-RS in a RB, as illustrated in FIGS. 4A-5C for a two CSI-RS antenna port transmitter. The CSI-RS of a cooperating transmitting station can be transmitted with or without RE muting by other cooperating transmitting stations.

Figure 4A:
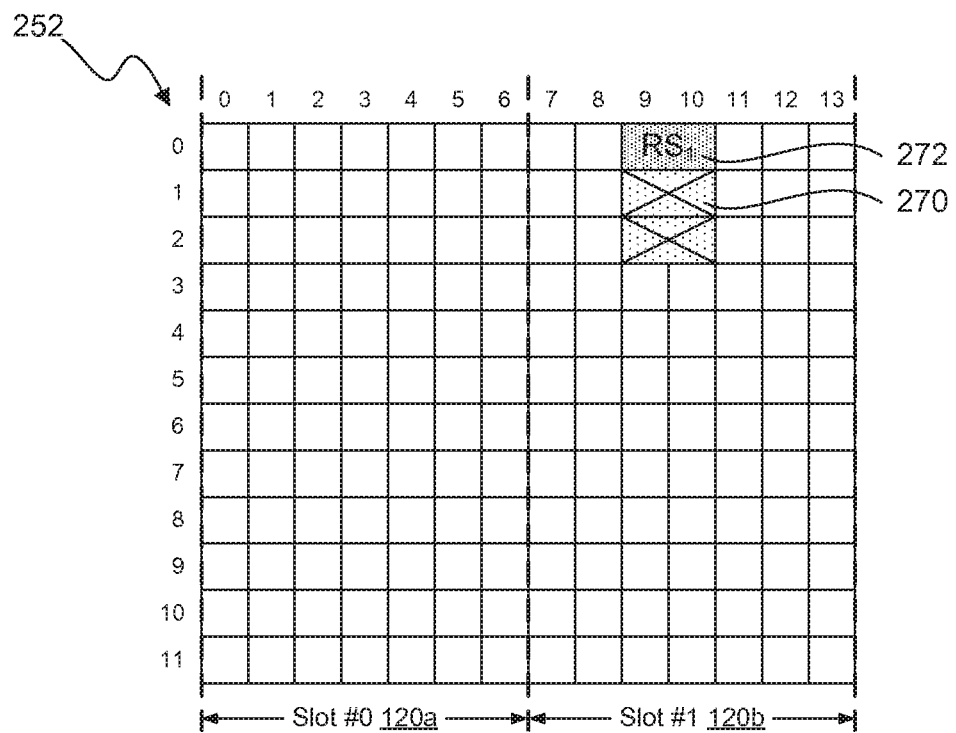
FIG. 4A illustrates a block diagram of channel state information reference signals (CSI-RS) in a resource block (RB) for a first wireless transceiver in a coordinated multipoint (CoMP) system with muted transmission of REs with the same frequency-domain index and the same time-domain index as other cooperating transmitting stations in accordance with an example.
Figure 4B:
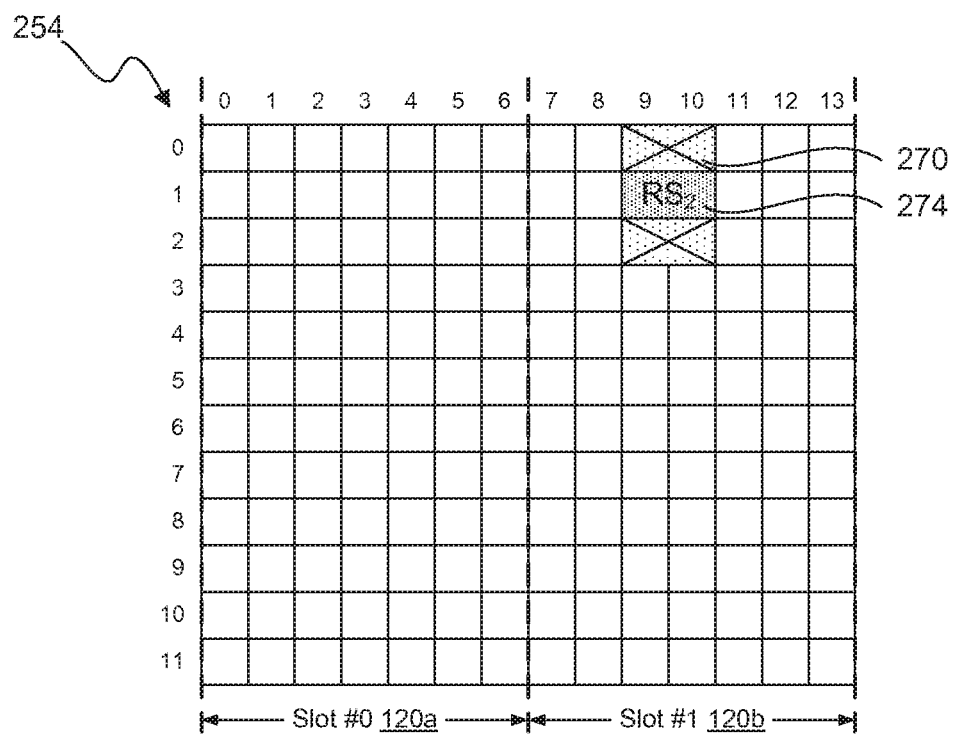
FIG. 4B illustrates a block diagram of channel state information reference signals (CSI-RS) in a resource block (RB) for a second wireless transceiver in a coordinated multipoint (CoMP) system with muted transmission of REs with the same frequency-domain index and the same time-domain index as other cooperating transmitting stations in accordance with an example.
Figure 4C:
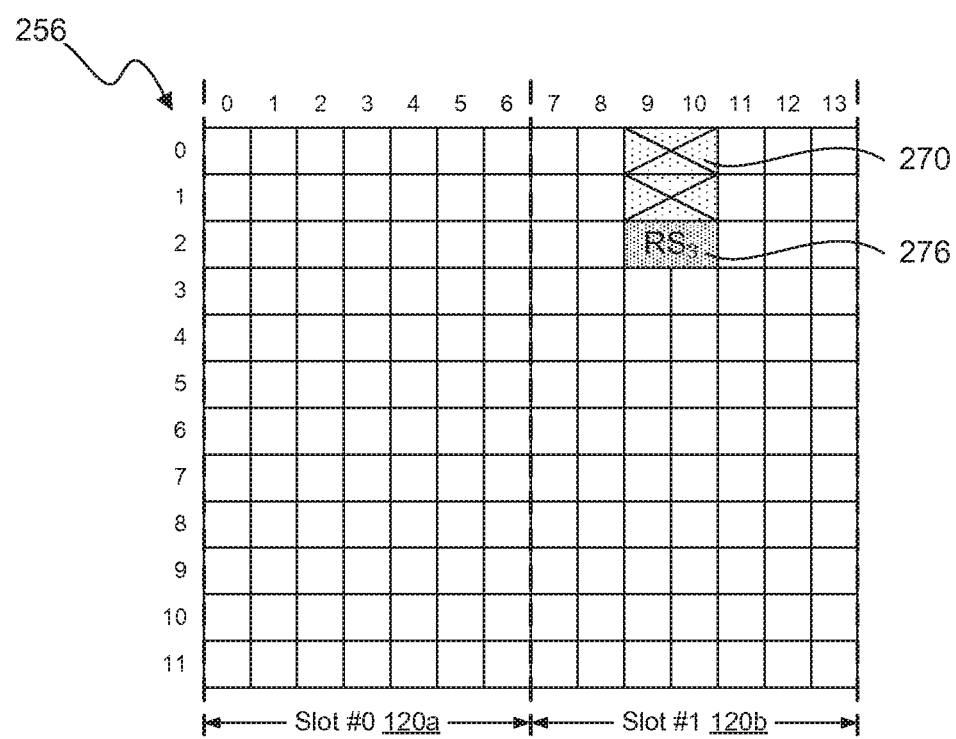
FIG. 4C illustrates a block diagram of channel state information reference signals (CSI-RS) in a resource block (RB) for a third wireless transceiver in a coordinated multipoint (CoMP) system with muted transmission of REs with the same frequency-domain index and the same time-domain index as other cooperating transmitting stations in accordance with an example.

With RE muting, a CSI-RS for a cell can be transmitted by each cooperating transmitting station while remaining cooperating transmitting stations mute transmission of REs with the same frequency-domain index and the same time-domain index as the CSI-RS transmitted by the cooperating transmitting station. For example FIGS. 4A-4C illustrate an example CSI-RS configuration with RE coordinated muting (within a physical resource block (PRB)) for three cooperating cells or transmitting stations in a in a CoMP environment. A RB 252 of a first transmitting station can include a CSI-RS ($RS_1$) 272, which can occupy 2 REs, and unused REs (X) 270 in a RB location (with the same frequency-domain index and the same time-domain index) of a CSI-RS ($RS_2$) from a second transmitting station and a CSI-RS ($RS_3$) from a third transmitting station, as illustrated in FIG. 4A.

FIG. 4B illustrates a RB 254 of the second transmitting station with a CSI-RS ($RS_2$) 274 and unused REs (X) 270. FIG. 4C illustrates a RB 256 of the third transmitting station with a CSI-RS ($RS_3$) 276 and unused REs (X) 270. Thus, the CSI-RSs ($RS_1$, $RS_2$, and $RS_3$) of cooperating transmitting stations may not have interference from other cooperating transmitting stations during the transmission of the CSI-RSs. A serving transmitting station can be a first, second, or third transmitting station. As illustrated in FIGS. 4A-4C, the interference from cooperating cells (or transmitting stations) may not present on the CSI-RS of the serving cell.

Figure 5A:
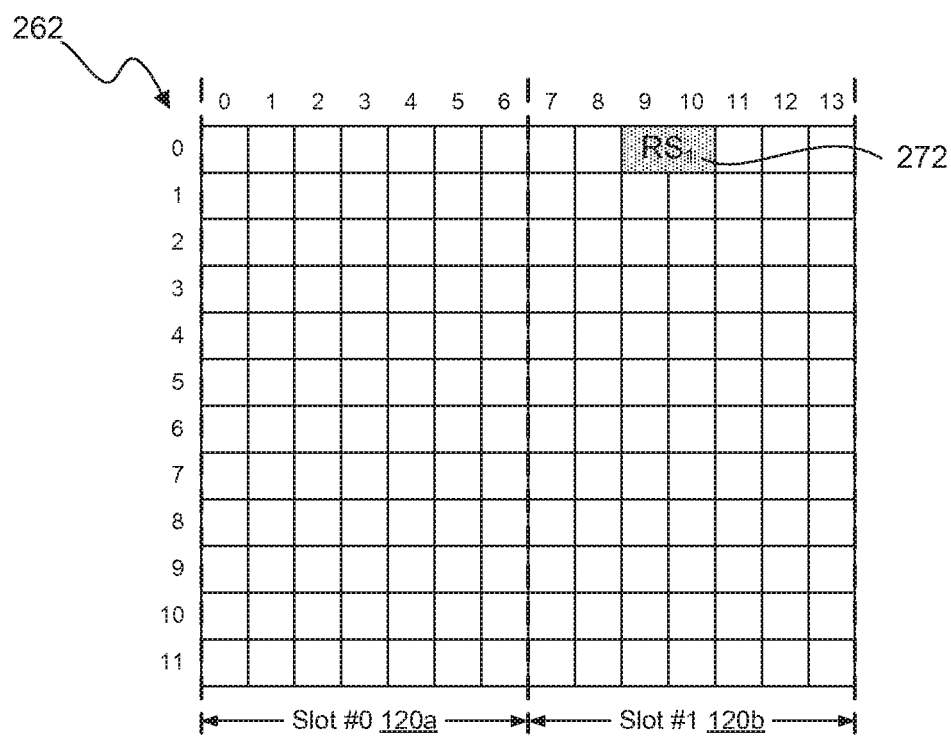
FIG. 5A illustrates a block diagram of channel state information reference signals (CSI-RS) in a resource block (RB) for a first wireless transceiver in a coordinated multipoint (CoMP) system with no muting of REs with the same frequency-domain index and the same time-domain index as other cooperating transmitting stations in accordance with an example.
Figure 5B:
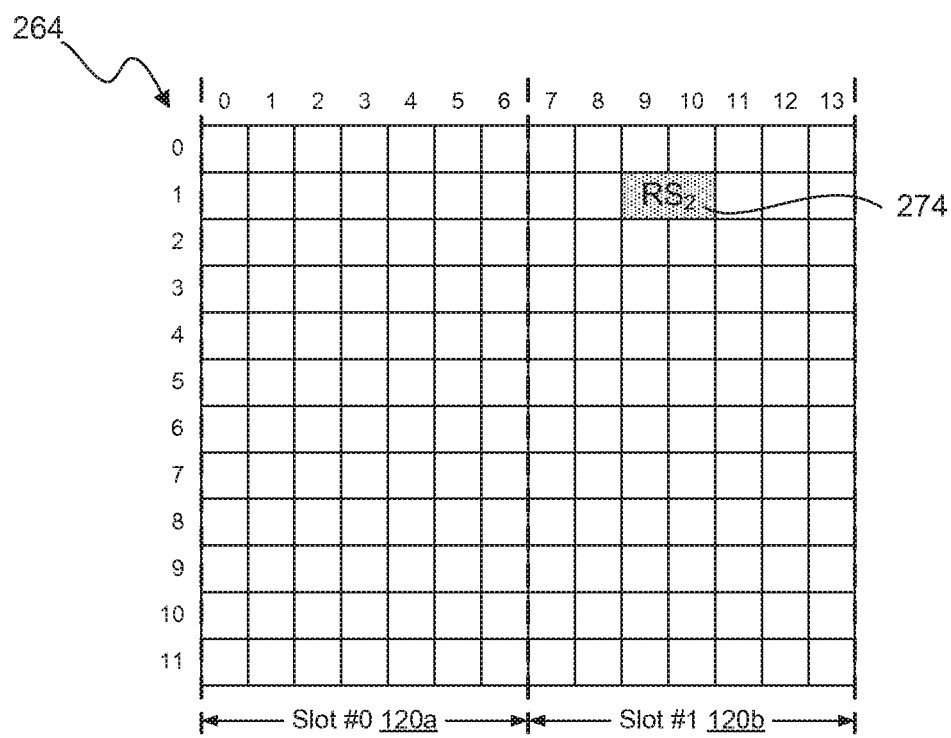
FIG. 5B illustrates a block diagram of channel state information reference signals (CSI-RS) in a resource block (RB) for a second wireless transceiver in a coordinated multipoint (CoMP) system with no muting of REs with the same frequency-domain index and the same time-domain index as other cooperating transmitting stations in accordance with an example.
Figure 5C:
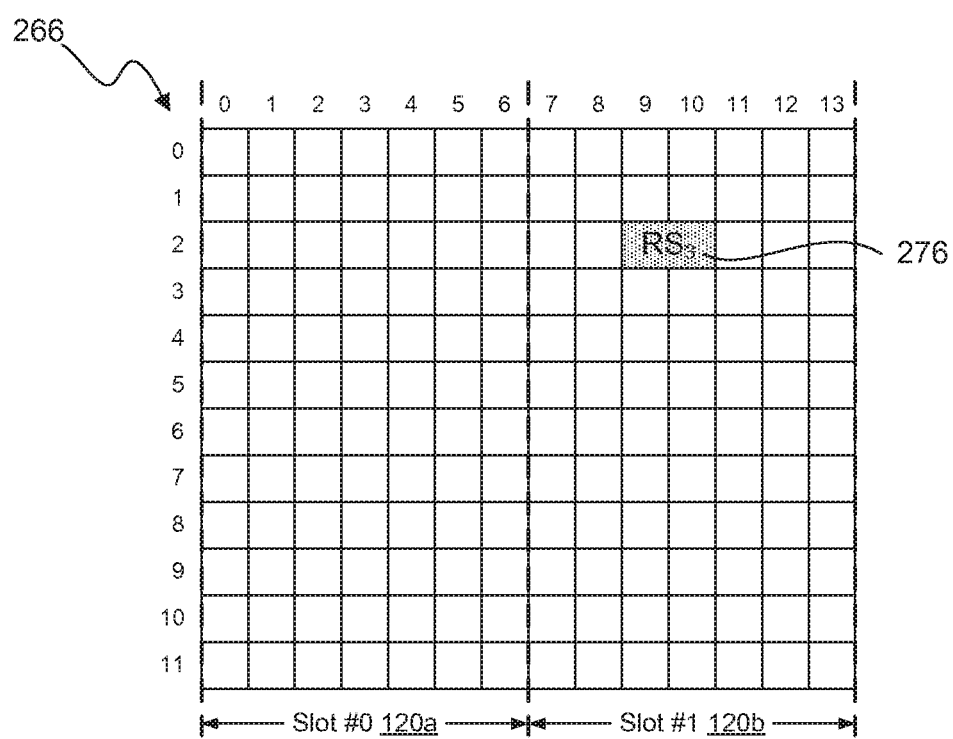
FIG. 5C illustrates a block diagram of channel state information reference signals (CSI-RS) in a resource block (RB) for a third wireless transceiver in a coordinated multipoint (CoMP) system with no muting of REs with the same frequency-domain index and the same time-domain index as other cooperating transmitting stations in accordance with an example.

In contrast, the CSI-RS of a cooperating transmitting station can be transmitted without RE muting by other cooperating transmitting stations. For example, FIG. 5A illustrates a RB 262 of the first transmitting station with the CSI-RS ($RS_1$) 272 without muting of REs. FIG. 5B illustrates a RB 264 of the second transmitting station with the CSI-RS ($RS_2$) 274 without muting of REs. FIG. 5C illustrates a RB 266 of the third transmitting station with the CSI-RS ($RS_3$) 276 without muting of REs. Thus, other cooperating transmitting stations may generate interference during the transmission of the CSI-RSs ($RS_1$, $RS_2$, and $RS_3$).

Figure 6A:
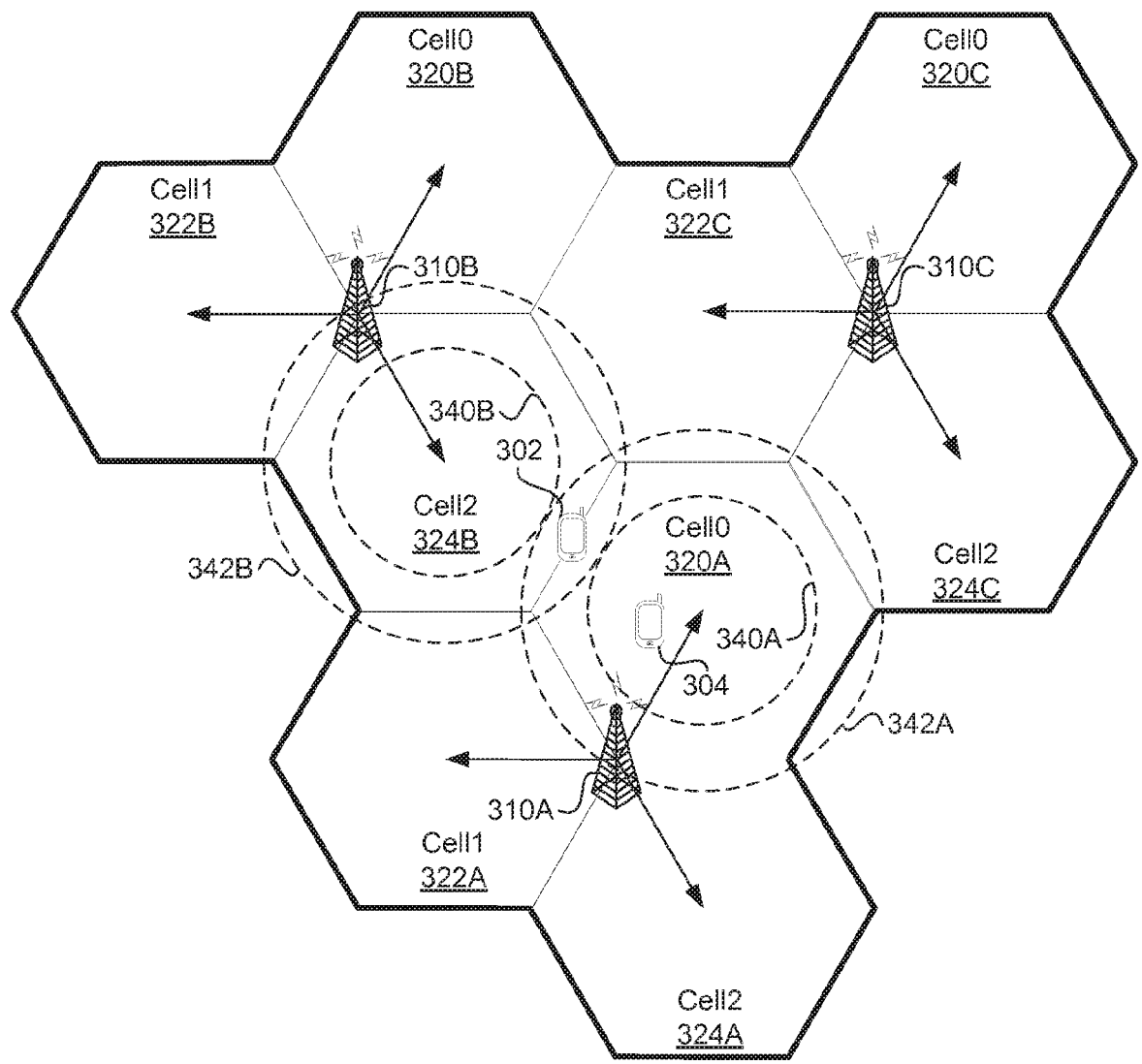
FIG. 6A illustrates a block diagram of an inter-site coordinated multipoint (CoMP) system with inner cell ranges and cell-edge ranges in accordance with an example.

In another example, CoMP transmission and reception allows for fractional frequency reuse (FFR). FFR can be a control method which assigns different frequency ranges (CC frequencies, channels, or sub-channels) for a cell-edge (or edge cell) transmission than an inner cell (or center cell) transmission to reduce interference from adjacent cells during transmission to a mobile communication device located on a cell-edge. For example, FIG. 6A illustrates an example of an inner cell (or center cell) 340A-B that represents an area in space (a geographic area) near the transmitting station where the transmission power and signal can be strong and a co-channel interference can be minimal. A cell-edge (or edge cell) 342A-B can be area near to the boundary of the cell where the transmission power and signal is weaker than an inner cell signal and the co-channel interference can be more significant. An inner cell mobile communication device 304 within the inner cell 340A of a first cell 320A can transmit and receive signals on the same inner cell frequency range (CC frequencies, channels, or sub-channels) as another mobile communication device (not shown) within the inner cell 340B of a second cell 320BA (or another cell) without any coordination between adjacent transmitting stations. Each cell can transmit and receive signals on the same inner cell frequency range because the transmission power and interference from an adjacent transmitting station within the inner cell can be minimal.

In contrast, a cell-edge mobile communication device 302 may be within both the cell-edge 342A of the first cell 320A and the cell-edge 342B of the second cell 320B. The first cell and second cell can allocate a subset of a total frequency bandwidth (CC frequencies, channels, or sub-channels) available to the cells for transmitting and receiving signals which are coordinated between cooperating transmitting stations (or adjacent transmitting stations). The cooperating transmitting stations may share use of the same cell-edge frequencies. In an example of coordinated scheduling, the coordination may allow one cooperating transmitting station (or cooperating cell) to transmit on a cell-edge frequency for a time period while the other cooperating transmitting stations (or cooperating cells) cease transmission for the duration of the time period on the cell-edge frequency. Then another cooperating transmitting station may take a turn using the cell-edge frequency while other cooperating transmitting station mute their transmissions on the cell-edge frequency, thus allowing cooperating transmitting station to share the cell-edge frequency. By coordinating transmission among multiple cooperating transmitting stations (or cooperating cells), interference from other cells can be reduced and the power of the desired signal can be increased.

Figure 6B:
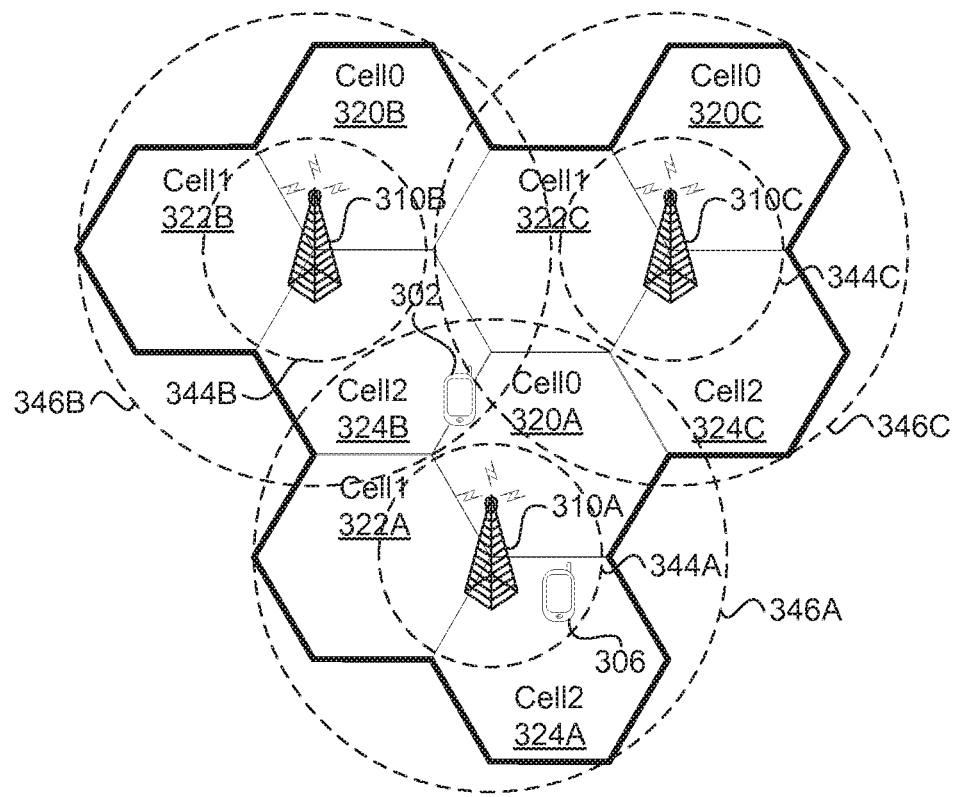
FIG. 6B illustrates a block diagram of an inter-site coordinated multipoint (CoMP) system with inner site ranges and site-edge ranges in accordance with an example.

Alternatively in an inter-site CoMP example, FFR can be used to assign different frequency ranges for site-edge (or edge site) transmission than inner site (or center site) transmission, as illustrated in FIG. 6B. A site can be associated with a transmitting station 310A-C. A mobile communication device 302 can be located within a site-edge area 346A-C which can overlap with other site-edge area, or a mobile communication device 302 can be located within an inner site area 344A-C. A site-edge transmission may be coordinated between cooperating transmitting stations.

Figure 7A:
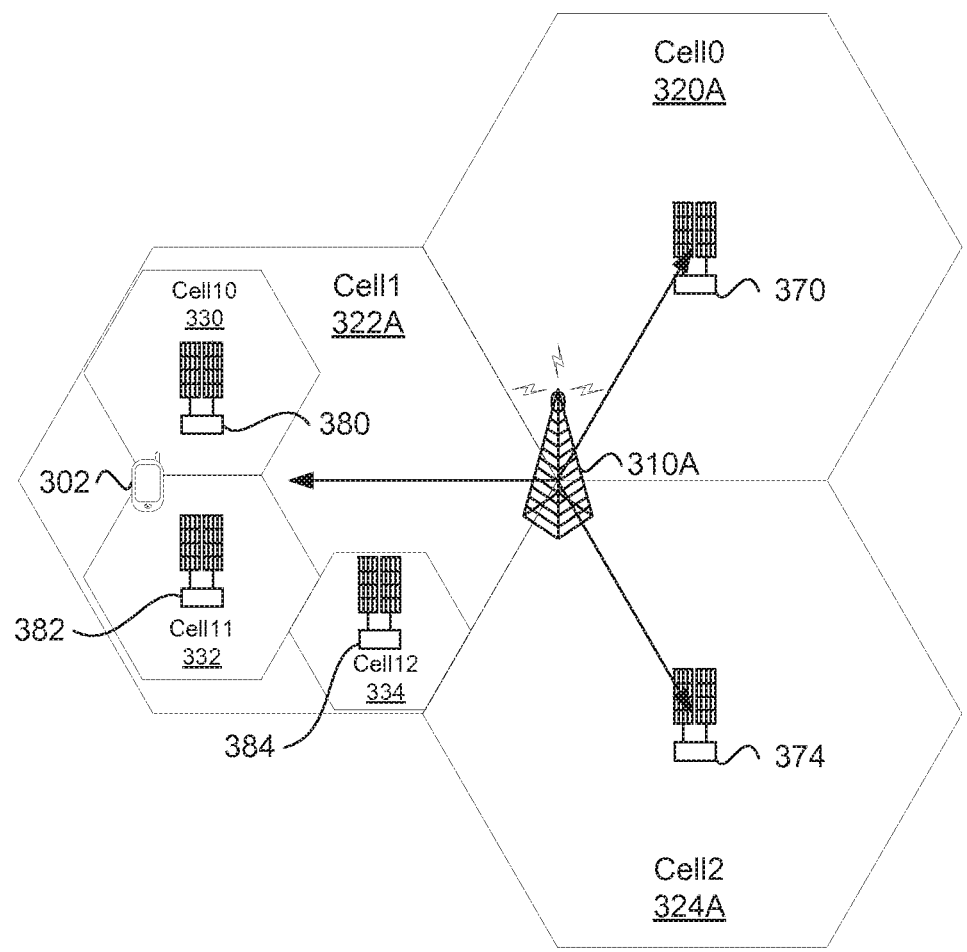
FIG. 7A illustrates a block diagram of an intra-site coordinated multipoint (CoMP) system with radio remote units (RRU) in accordance with an example.
Figure 7B:
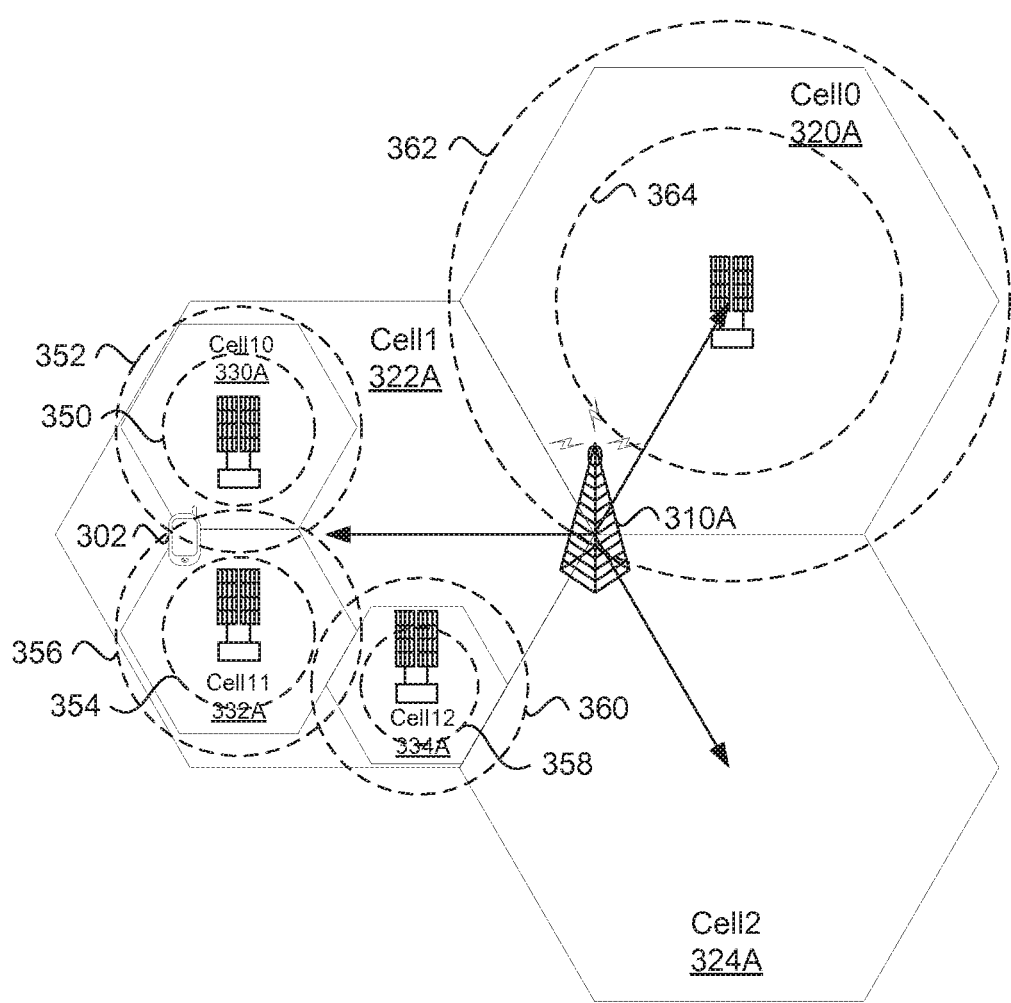
FIG. 7B illustrates a block diagram of an intra-site coordinated multipoint (CoMP) system with inner cell ranges and cell-edge ranges of radio remote units (RRU) in accordance with an example.

In an intra-site CoMP example illustrated in FIG. 7A, RRUs of an eNode B may located at different locations in space, and CoMP coordination may be within a single eNode B. A cell 322A of an eNode B may be further sub-divided into sub-cells 330, 332, and 334. RRUs 380, 382, and 384 may transmit and receive signals for a sub-cell. RRUs 370 and 374 may transmit and receive signals for a cell 320A and 324A. A mobile communication device 302 can be on a sub-cell edge (or cell-edge) and intra-site CoMP coordination can occur between the RRUs. FIG. 7B illustrates an example wherein each sub-cell may have an inner sub-cell space 350, 354, or 358 and a sub-cell edge space 352, 356, or 360 with different frequencies assigned to the inner sub-cell space and the sub-cell edge space. Similarly, each cell may have an inner cell space 364 and cell-edge space 362 with different frequencies assigned to the inner cell space and the cell-edge space.

A transmitting station with CoMP functionality can perform signal processing for coordinated transmission and reception by multiple cells to one or more mobile communication device. For example, CoMP transmission and reception can be implemented as autonomous distributed control based on an independent eNode B configuration, or centralized control based on RRUs or RREs. With an independent eNode B configuration, signaling over wired/fiber or wireless transmission paths can be used between multiple eNode Bs to coordinate among cells, as illustrated in FIG. 6A. With RRE configurations, multiple connected RREs carry a baseband signal between cells and the central eNode B, which performs the baseband signal processing and control, so the radio resources between the cells can be controlled at the central eNode B, as illustrated in FIG. 7A.

Figure 8:
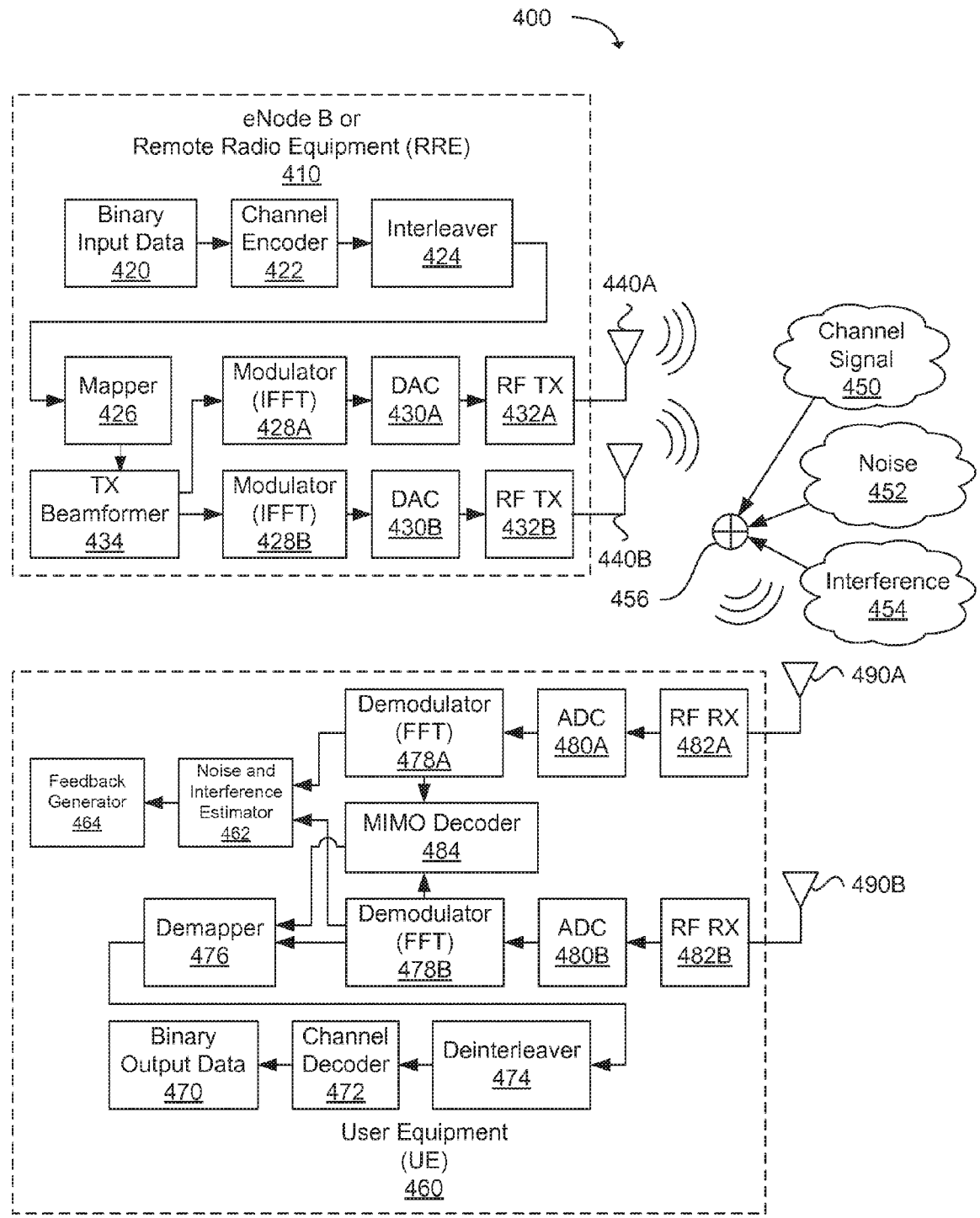
FIG. 8 illustrates a block diagram of the physical layer of a transmitter and receiver in an orthogonal frequency-division multiplexing (OFDM) wireless network with a noise and interference estimator in accordance with an example.

A wireless communication system can be subdivided into various sections referred to as layers. In the LTE system, communication layers can include the physical (PHY), media access control (MAC), radio link control (RLC), packet data convergence protocol (PDCP), and radio resource control (RRC) layers. The physical layer can include the basic hardware transmission components of a wireless communication system 400, as illustrated in FIG. 8. A basic multiple-input multiple-output (MIMO) system is used for simplicity in illustrating the basic hardware transmission components, but the components can also be adapted for a SISO system or similar system. For example in a MIMO system, at the transmitter 410, binary input data 420 can be protected through encoding using a channel encoder 422, interleaved against fading phenomenon using an interleaver 424, and mapped to improve reliability using a mapper 426. The mapped data can be separated into layers for antenna ports by a transmitter (TX) beamformer 434 and the layers can be OFDM modulated into OFDM symbols using modulators 428A-B. The modulators can use an inverse fast Fourier transform (IFFT) algorithm to compute the inverse discrete Fourier transform (IDFT) to generate modulated signals (vector x for each antenna port). The modulated signals can be converted to analog signals with digital-to-analog converters (DACs) 430A-B. The analog signals can be transmitted via radio frequency (RF) transmitters (TXs) 432A-B configured to send the signal to transmitter antennas 440A-B operable to communicate the signal. The analog signals will follow a path referred to as a channel. The analog signals travelling through that path can be referred to as a channel signal 450. The physical layer can include other components (not shown), such as series-to-parallel (SIP) converters, parallel-to-serial (PIS) converters, cyclic prefix (CP) inserters and deleters, guardband inserters and deleters, and other desired components.

The transmitted channel signal 450 can be subject to noise 452 and interference 454. The noise and interference is represented as an addition 456 to the channel signal, which can be received by receiver antennas 490A-B and a radio frequency (RF) receivers (RXs) 482A-B at the receiver 460. The channel signal combined with the noise and interference can be converted to a digital modulated signal with analog-to-digital converters (ADCs) 480A-B. The digital signal can be OFDM demodulated using demodulators 478A-B. The demodulators can use a fast Fourier transform (FFT) algorithm to compute the discrete Fourier transform (DFT) to generate demodulated signals (vector y for each antenna port). A noise and interference estimator 462 can use the demodulated signal to estimate the channel 450 and the noise 452 and interference 454 that occurs in the channel and provide noise and interference estimation. The noise and interference estimator can generate a non-cooperating interference noise covariance matrix for use in a CoMP environment. The non-cooperating interference noise covariance matrix can be an input to a feedback generator 464, which can generate a feedback report, such as a channel quality indicator (CQI) report, a preceding matrix indicator (PMI) report, or a transmission rank indicator (RI) report. The CQI can be used to assist the MIMO transmissions modes. The demodulated signals can be combined using a HMO decoder 484, demapped using a demapper 476, deinterleaved using a deinterleaver 474, and decoded by a channel decoder 472 to generate binary output data 470 that can be used by other layers of the receiving station.

The non-cooperating interference noise covariance matrix can be calculated directly using the CSI-RS with coordinated muting of REs of the cooperating transmitting station in the CoMP system, or generated indirectly using CRS and channel matrices for each cooperating transmitting station in the CoMP system where the channel matrices can be measured using CSI-RS.

In an inner cell or a single-cell (without CoMP or coordination), the transmitted signal can be distributed by the channel to the several receive antennas (as in a MIMO system) and disturbed by additive white Gaussian noise (AWGN). A received signal vector y for each antenna port can be represented by $y=h \cdot r+n$ where r is the transmitted reference signal. An estimated channel $\hat{h}$ for each antenna port is vector with complex entries which can account for the random fluctuations and the random phase shifts of the channel transfer characteristics. The vector y can represent the (N×1) received signal at the antenna array at the receiver, where N is a number of receiving antennas. A vector n can be the (N×1) complex noise vector.

In non-CoMP system, channel state information (CSI), which includes the CQI, PMI, and RI, can be calculated by a mobile communication device based on channel measurements $\hat{h}$ for each antenna port from a serving transmitting station, and an interference and noise estimation or covariance matrix $\hat{R}_{ni}^{total}$ from other interfering transmitting stations and sources. The channel estimation matrix $\hat{h}$ can be obtained from the received signal vector y on the resource elements (REs) occupied by cell-specific reference signal (CRS) $r_{CRS}$, which can be determined at the mobile communication device. The interference estimation $\hat{R}_{ni}^{total}$ may also be obtained from the received signal vector y by using the estimated channel $\hat{h}$ and the CRS $r_{CRS}$, transmitted by the serving transmitting station. For example, the estimation of the interference noise covariance matrix $\hat{R}_{ni}^{total}$ represented by Equation 1, shown below, can be calculated using a noise and interference estimator where E{ } is an averaging procedure over REs occupied by reference signals of different antenna ports in a given time-frequency resource(s), such as a RB, $(\ )^H$ is a Hermitian function or a conjugate transpose, y is a received signal of the CRS, $\hat{h}$ is an estimated channel for the serving transmitting station using the CRS, and $r_{crs}$ is the CRS transmitted by the serving transmitting station. The noise and interference estimator can measure the residual interference noise after subtraction of the CRS signal $\hat{h} \cdot r_{crs}$ transmitted by the serving transmitting station from the total received CRS signal vector y. For the inner cell or a single-cell scenario, the estimated interference noise covariance matrix can include aggregated interference from the interfering transmitting stations transmitting in the same time-frequency resource (e.g., RB) as the serving transmitting station.

$$\hat{R}_{ni}^{total}=E\{(y-\hat{h} \cdot r_{crs})(y-\hat{h} \cdot r_{crs})^H\} \qquad [\text{Equation 1}]$$

In the multi-cell systems with coordination (or CoMP systems), calculating the CSI can use a separate interference noise estimation for cooperating transmitting station of the CoMP system and the other remaining transmitting stations (non-cooperating transmitting stations), which are not involved in a beamforming coordination. The interference noise from cooperating transmitting stations can include the channels matrices $g_k$ from each cooperating transmitting station(k) ($eNB_k$) involved in the coordination, where k is an integer representing each transmitting station in the coordination. For obtaining the channel estimation $\hat{h}$ for each antenna port, the channel measurement for the coordinated transmitting station(k) may follow a similar channel measurement procedure as is used for the serving transmitting station using references signals, such as the CRS or CSI-RS. The interference noise from the other remaining transmitting stations outside the CoMP system can consist of an aggregated non-cooperating interference noise covariance matrix $\hat{R}_{ni}^{out}$, which represents a part of the interfering transmitting stations which are not involved in the coordination. So compared with inner cell or a single-cell aggregated noise and interference $\hat{R}_{ni}^{total}$, a non-cooperating interference noise covariance matrix $\hat{R}_{ni}^{out}$ excludes the interference from cooperating transmitting stations.

A total interference noise estimation based on CRS calculates the total aggregated noise and interference $\hat{R}_{ni}^{total}$ from the interfering transmitting stations, including the cooperating transmitting stations. The total interference noise covariance matrix $\hat{R}_{ni}^{total}$ includes both the non-cooperating interference noise covariance matrix $\hat{R}_{ni}^{out}$ and a cooperating interference noise covariance matrix. The total interference noise estimation may not be used for CSI calculation in a coordinated beamforming scheme (or other type of coordination) because the total interference noise estimation may not account for the CoMP environment. Thus, the mobile communication device estimates the non-cooperating interference noise covariance matrix $\hat{R}_{ni}^{out}$ corresponding to the CoMP environment mobile for a CSI calculation.

The non-cooperating interference noise covariance matrix $\hat{R}_{ni}^{out}$ can be calculated directly or indirectly. In direct non-cooperating noise and interference estimation, the mobile communication device can use the CSI-RS (instead of the CRS) with enabled coordinated muting of the cooperating transmitting stations on the REs occupied by CSI-RS for the interference noise measurement, as illustrated in FIGS. 4A-4C. Enabled coordinated muting facilitates the generation of the interference measurement from the transmitting stations which are not involved in the coordination. With the enabled coordinated muting of the cooperating transmitting stations on the REs occupied by CSI-RS, the CSI-RS may experience interference from other remaining transmitting stations (non-cooperating transmitting stations) which are not involved in the coordination. In the CSI-RS with the RE muting configuration, a noise and interference estimator applied on the CSI-RS can provide the non-cooperating interference noise covariance matrix estimate $\hat{R}_{ni}^{out}$ for the transmitting stations (non-cooperating transmitting stations) outside the cooperating set.

For example, the non-cooperating interference noise covariance matrix estimate $\hat{R}_{ni}^{out}$ can be represented by Equation 2, shown below, where, y is a received signal on the CSI-RS, $\hat{h}$ is an estimated channel for the serving transmitting station using the CSI-RS, and $r_{csi}$ is the CSI-RS transmitted by the serving transmitting station. If the estimation is performed using the CSI-RS the estimated interference noise $\hat{R}_{ni}^{out}$ may include the desired interference noise from non-cooperative cells (or non-cooperating transmitting stations).

$$\hat{R}_{ni}^{out} = E\{(y-\hat{h}\cdot r_{csi})(y-\hat{h}\cdot r_{csi})^H\}$$ [Equation 2]

In indirect non-cooperating noise and interference estimation, the non-cooperating interference noise covariance matrix estimate $\hat{R}_{ni}^{out}$ can be generated by the total interference noise covariance matrix $\hat{R}_{ni}^{total}$ (based on CRS) minus interference channel measurements (based on CSI-RS) for cooperating transmitting stations represented by Equation 3, where y is a received signal on the CRS, $\hat{h}$ is an estimated channel for the serving transmitting station using the CRS, r is the CRS transmitted by the serving transmitting station, and $\lambda_k$ is a power weighting factor for each cooperating transmitting station (or cooperating cell) and $\hat{g}_k$ is a channel estimation for each cooperating transmitting station (or cooperating cell) where k is a positive integer representing each cooperating transmitting station (or cooperating cell). The power weighting factor $\lambda_k$ can be a parameter configured for each cell (or transmitting station) accounting for the possible power difference between the CRS and the CSI-RS used in the indirect non-cooperating noise and interference estimation calculation.

$$\hat{R}_{ni}^{out} = E\{(y-\hat{h}\cdot r)(y-\hat{h}\cdot r)^H\} - \sum_k \lambda_k \cdot \hat{g}_k \hat{g}_k^H$$ [Equation 3]

An estimator using signal model y=$\hat{h}$·r+n for the serving transmitting station (or serving cell) using a CSI-RS can perform two steps. First, the estimator can obtain a least square estimation of h on each RE where CSI-RS is transmitted represented by $\hat{h}_{LS}$=y/r, where r is a CSI-RS sequence of the serving transmitting station. The CSI-RS (or other RS) can be transmitted in each RB of the downlink subframe. Second, the estimator can filter the least square estimates $h_{LS}$ across the RBs to obtain the final channel estimation $\hat{h}$. Filtering can be performed using a Wiener filter that can minimize the mean square error of an estimation. Filtering can exploit the phenomenon that the channel is usually correlated on the neighboring subcarriers. A cooperating transmitting station channel estimation $g_k$ can be performed in a similar way as the serving transmitting station channel estimation $\hat{h}$. In the cooperating transmitting station channel estimation, the estimator can apply a similar process to the estimation of $g_k$, but the CSI-RS of the other cooperating transmitting stations (or neighboring cells) can be used instead of the CSI-RS of the serving transmitting station to estimate $g_k$.

Indirect non-cooperating noise and interference estimation can use CSI-RS without muting of other REs in a RB, as illustrated in FIGS. 5A-C, or use CSI-RS with muting of the REs in the same time-frequency location in a RB occupied by the CSI-RS of other cooperating transmitting stations, as illustrated in FIGS. 4A-C. In indirect non-cooperating noise and interference estimation, RE muting (FIGS. 4A-4C) is not a mandatory requirement, but can be used to reduce interference on CSI-RS from cooperating cells and improve accuracy of the $g_k$ channel measurement.

A noise and interference estimator (462 of FIG. 8) in a user equipment (UE) for a coordinated multipoint (CoMP) system can include an estimating module, a cooperating interference measurement module, a power factor weighting module, and a summing module. The estimating module can estimate a total interference noise covariance matrix using cell-specific reference signals (CRS) and generate a cooperating channel matrix for each cooperating transmitting station in the CoMP system from a channel state information reference signal (CSI-RS). The cooperating interference measurement module can determine a cooperating interference channel measurement from each cooperating transmitting station. The cooperating interference measurement module can generate a conjugate transpose cooperating channel matrix and multiply each cooperating channel matrix by a conjugate transpose cooperating channel matrix to form a cooperating interference channel measurement. The power factor weighting module can receive a cooperating weighting factor for each cooperating interference channel measurement from each cooperating transmitting station. The cooperating weighting factor can compensate for a power difference between the CRS and CSI-RS. The summing module can sum each cooperating interference channel measurement to form a cooperating interference channel measurement sum and subtract the cooperating interference channel measurement sum from the total interference noise covariance matrix to form a non-cooperating interference noise covariance matrix. When the power factor weighting module is used, the cooperating interference measurement module can multiply the cooperating weighting factor by the cooperating interference channel measurement and the summing module can add each cooperating interference channel measurement with the cooperating weighting factor to form a cooperating interference channel measurement sum.

The noise and interference estimator (462 of FIG. 8) may be used to estimate the original channel $\hat{h}$ serving transmitting station in an OFDM transmission, the total interference noise covariance matrix $\hat{R}_{ni}^{total}$ (including cooperating eNBs) using CRS, the non-cooperating interference noise covariance matrix estimate $\hat{R}_{ni}^{out}$ with RE muting using CSI-RS and without RE muting, and channel matrices $g_k$ for each cooperating transmitting station. The channel estimation $\hat{h}$ and the non-cooperating interference noise covariance matrix estimate $\hat{R}_{ni}^{out}$ can be used as an input for a channel quality indicator (CQI) report, a preceding matrix indicator (PMI) report, a transmission rank indicator (RI) report, and other feedback reports for use in a CoMP environment.

Figure 9:
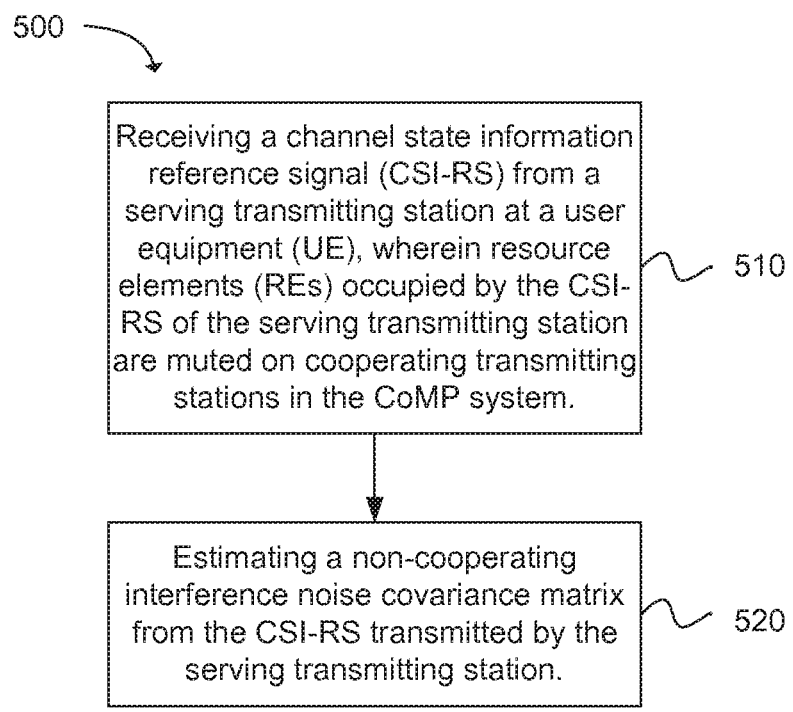
FIG. 9 depicts a flow chart of a method for estimating noise and interference in a coordinated multipoint (CoMP) system at a mobile communication device using a channel state information reference signal (CSI-RS) in accordance with an example.

Another example provides a method 500 for estimating noise and interference in a coordinated multipoint (CoMP) system at a mobile communication device, as shown in the flow chart in FIG. 9. The method includes the operation of receiving a channel state information reference signal (CSI-RS) from a serving transmitting station at a user equipment (UE), wherein resource elements (REs) occupied by the CSI-RS of the serving transmitting station are muted on cooperating transmitting stations in the CoMP system, as in block 510. The operation of estimating a non-cooperating interference noise covariance matrix from the CSI-RS transmitted by the serving transmitting station follows, as in block 520.

Figure 10:
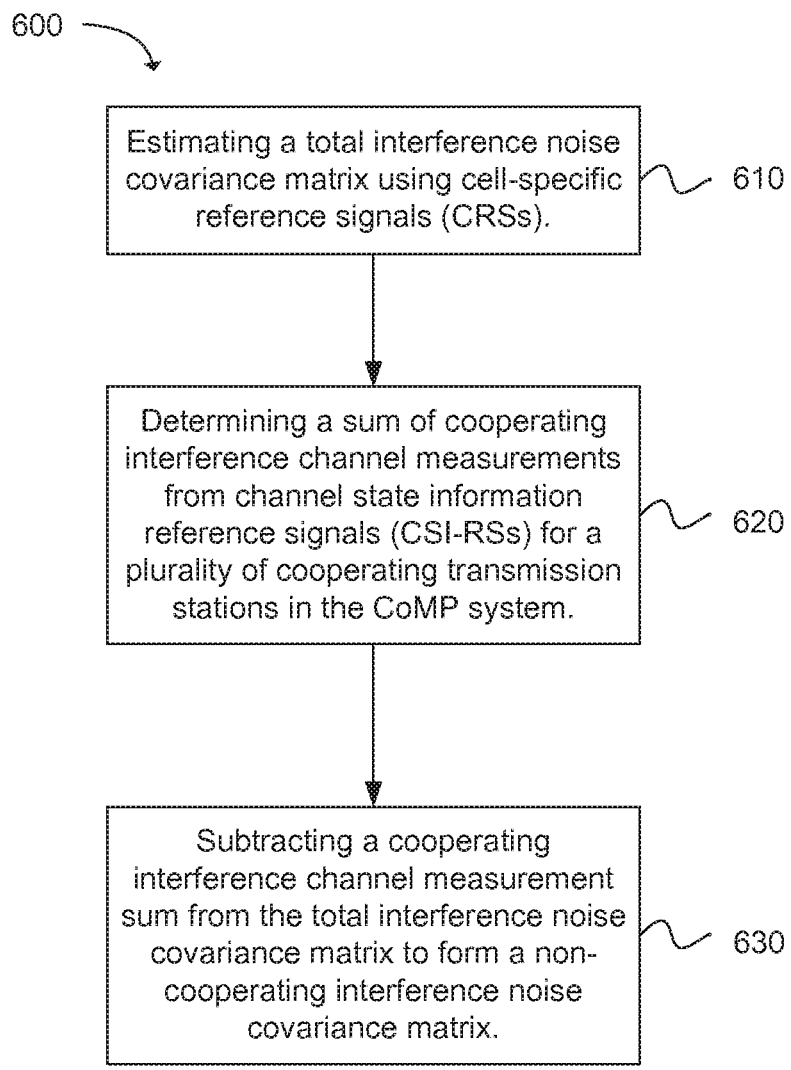
FIG. 10 depicts a flow chart of a method for estimating noise and interference in a coordinated multipoint (CoMP) system at a mobile communication device using a total interference noise covariance matrix in accordance with an example.

Another example provides a method 600 for estimating noise and interference in a coordinated multipoint (CoMP) system at a mobile communication device, as shown in the flow chart in FIG. 10. The method includes the operation of estimating a total interference noise covariance matrix using cell-specific reference signals (CRSs), as in block 610. The operation of determining a sum of cooperating interference channel measurements from channel state information reference signals (CSI-RSs) for a plurality of cooperating transmission stations in the CoMP system follows, as in block 620. The next operation of the method includes subtracting a cooperating interference channel measurement sum from the total interference noise covariance matrix to form a non-cooperating interference noise covariance matrix, as in block 630.

The operation of determining the sum of the cooperating interference channel measurement can include: generating a cooperating channel matrix for each cooperating transmitting station in the CoMP system from CSI-RSs; multiplying each cooperating channel matrix by a conjugate transpose cooperating channel matrix to form a cooperating interference channel measurement for each cooperating transmitting station; and summing the cooperating interference channel measurement to form the sum of cooperating interference channel measurements. The method 600 can further include the operation of receiving a cooperating weighting factor for each cooperating interference channel measurement from each cooperating transmitting station. When the cooperating weighting factor is used the method can sum the cooperating interference channel measurement, which can include weighting each cooperating interference channel measurement with the corresponding cooperating weighting.

Multiple-input multiple-output (MIMO) is a radio communication technique in which both a transmitter and a receiver use multiple antennas to wirelessly communicate with one another. By using multiple antennas at the transmitter and receiver, the spatial dimension may be taken advantage of in a manner that improves overall performance of the wireless link. The non-cooperating interference noise covariance matrix can be used in coordinated multi-point MIMO beamforming with two, four, and eight transmitting antennas.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for estimating noise and interference in a coordinated multipoint (CoMP) system at a mobile communication device, comprising:

receiving a channel state information reference signal (CSI-RS) from a serving transmitting station at a user equipment (UE), wherein resource elements (REs) occupied by the CSI-RS of the serving transmitting station are muted on cooperating transmitting stations in the CoMP system; and estimating a non-cooperating interference noise covariance matrix from the CSI-RS transmitted by the serving transmitting station.

2. The method of claim 1, wherein the non-cooperating interference noise covariance matrix is represented by $\hat{R}_{ni}^{out}=E\{(y-\hat{h}\cdot r_{csi})(y-\hat{h}\cdot r_{csi})^H\}$, where $\hat{R}_{ni}^{out}$ is the non-cooperating interference noise covariance matrix, $E\{\}$ is an averaging function for the CSI-RS, $(\ )^H$ is a Hermitian function, y is a received signal on the CSI-RS, $\hat{h}$ is an estimated channel for the serving transmitting station using the CSI-RS, and $r_{csi}$ is the CSI-RS transmitted by the serving transmitting station.

3. The method of claim 1, wherein each cooperating transmitting station is selected from the group consisting of an eNode B, a remote radio unit (RRU), and a remote radio equipment (RRE).

4. The method of claim 1, wherein receiving the CSI-RS further comprises:

receiving a plurality of known CSI-RS and a plurality of muted resource elements (RE) in an orthogonal frequency-division multiplexed (OFDM) signal, wherein a CSI-RS for a cell is transmitted by each cooperating transmitting station while remaining cooperating transmitting stations mute transmission of REs with the same frequency-domain index and the same time-domain index as the CSI-RS transmitted by the cooperating transmitting station.

5. The method of claim 1, further comprising generating a feedback report, wherein the non-cooperating interference noise covariance matrix is used as an input for generating the feedback report selected from the group consisting of a channel quality indicator (CQI) report, a preceding matrix indicator (PMI) report, and a transmission rank indicator (RI) report.

6. A non-transitory computer program product, comprising a computer usable medium having a computer readable program code embodied therein, the computer readable program code adapted to be executed to implement the method of claim 1.

7. The non-transitory computer program product of claim 6, wherein the non-cooperating interference noise covariance matrix is represented by $\hat{R}_{ni}^{out}=E\{(y-\hat{h}\cdot r_{csi})(y-\hat{h}\cdot r_{csi})^H\}$, where $\hat{R}_{ni}^{out}$ is the non-cooperating interference noise covariance matrix, $E\{\}$ is an averaging function for the CSI-RS, $(\ )^H$ is a conjugate transpose, y is a received signal on the CSI-RS, $\hat{h}$ is an estimated channel for the serving transmitting station using the CSI-RS, and $r_{csi}$ is the CSI-RS transmitted by the serving transmitting station.

8. A method for estimating noise and interference in a coordinated multipoint (CoMP) system at a mobile communication device, comprising:

estimating a total interference noise covariance matrix using cell-specific reference signals (CRSs);

determining a sum of cooperating interference channel measurements from channel state information reference signals (CSI-RSs) for a plurality of cooperating transmission stations in the CoMP system;

subtracting a cooperating interference channel measurement sum from the total interference noise covariance matrix to form a non-cooperating interference noise covariance matrix.

9. The method of claim 8, wherein each cooperating transmitting station is selected from the group consisting of an eNode B, a remote radio unit (RRU), and a remote radio equipment (RRE).

10. The method of claim 8, wherein determining the sum of the cooperating interference channel measurement further comprising:

generating a cooperating channel matrix for each cooperating transmitting station in the CoMP system from CSI-RSs;

multiplying each cooperating channel matrix by a conjugate transpose cooperating channel matrix to form a cooperating interference channel measurement for each cooperating transmitting station; and summing the cooperating interference channel measurement to form the sum of cooperating interference channel measurements.

11. The method of claim 10, further comprising:

receiving a cooperating weighting factor for each cooperating interference channel measurement from each cooperating transmitting station, wherein the cooperating weighting factor compensates for a power difference between the CRS and CSI-RS, and wherein summing the cooperating interference channel measurement includes weighting each cooperating interference channel measurement with the corresponding cooperating weighting.

12. The method of claim 10, wherein generating the cooperating channel matrix for each cooperating transmitting station from CSI-RSs further comprises:

receiving a plurality of known CSI-RSs and a plurality of muted resource elements (RE) in an orthogonal frequency-division multiplexed (OFDM) signal, wherein a CSI-RS for a cell is transmitted by each cooperating transmitting station while remaining cooperating transmitting stations mute transmission of REs with the same frequency-domain index and the same time-domain index as the CSI-RS transmitted by the cooperating transmitting station.

13. The method of claim 8, further comprising generating a feedback report, wherein the non-cooperating interference noise covariance matrix is used as an input for generating the feedback report selected from the group consisting of a channel quality indicator (CQI) report, a preceding matrix indicator (PMI) report, and a transmission rank indicator (RI) report.

14. The method of claim 8, wherein the non-cooperating interference noise covariance matrix is represented by $$\hat{R}_{ni}^{out} = E\{(y-\hat{h}\cdot r)(y-\hat{h}\cdot r)^H\} - \sum_k \lambda_k \cdot g_k g_k^H,$$

where $\hat{R}_{ni}^{out}$ is the non-cooperating interference noise covariance matrix, $E\{\}$ is an averaging function for the CRS, $(\ )^H$ is a Hermitian function, y is a received signal on the CRS, $\hat{h}$ is an estimated channel for the serving transmitting station using the CRS, r is the CRS transmitted by the serving transmitting station, and $\lambda_k$ is a power weighting factor for each cooperating transmitting station and $g_k$ is a channel matrix for each cooperating transmitting station where k is a positive integer representing each cooperating transmitting station.

15. A non-transitory computer program product, comprising a computer usable medium having a computer readable program code embodied therein, the computer readable program code adapted to be executed to implement the method of claim 8.

16. The non-transitory computer program product of claim 15, wherein determining the sum of the cooperating interference channel measurement further comprising:
- generating a cooperating channel matrix for each cooperating transmitting station in the CoMP system from CSI-RSs;
- multiplying each cooperating channel matrix by a conjugate transpose cooperating channel matrix to form a cooperating interference channel measurement for each cooperating transmitting station; and
- summing the cooperating interference channel measurement to form the sum of cooperating interference channel measurements.

17. The non-transitory computer program product of claim 15, wherein the non-cooperating interference noise covariance matrix is represented by $$\hat{R}_{ni}^{out} = E\{(y - \hat{h} \cdot r)(y - \hat{h} \cdot r)^H\} - \sum_k \lambda_k \cdot g_k g_k^H,$$

where $\hat{R}_{ni}^{out}$ is the non-cooperating interference noise covariance matrix, $E\{\ \}$ is an averaging function for the CRS, $(\ )^H$ is a conjugate transpose, y is a received signal on the CRS, $\hat{h}$ is an estimated channel for the serving transmitting station using the CRS, r is the CRS transmitted by the serving transmitting station, and $\lambda_k$ is a power weighting factor for each cooperating transmitting station and $g_k$ is a channel matrix for each cooperating transmitting station where k is a positive integer representing each cooperating transmitting station.

18. A noise and interference estimator in a user equipment (UE) for a coordinated multipoint (CoMP) system, comprising:
- an estimating module for estimating a total interference noise covariance matrix using cell-specific reference signals (CRS) and generating a cooperating channel matrix for each cooperating transmitting station in the CoMP system from a channel state information reference signal (CSI-RS);
- a cooperating interference measurement module for determining a cooperating interference channel measurement from each cooperating transmitting station; and
- a summing module for summing each cooperating interference channel measurement to form a cooperating interference channel measurement sum and subtracting the cooperating interference channel measurement sum from the total interference noise covariance matrix to form a non-cooperating interference noise covariance matrix.

19. The noise and interference estimator of claim 18, wherein the cooperating interference measurement module further comprises generating a conjugate transpose cooperating channel matrix and multiplying each cooperating channel matrix by a conjugate transpose cooperating channel matrix to form a cooperating interference channel measurement.

20. The noise and interference estimator of claim 19, further comprising:
- a power factor weighting module for receiving a cooperating weighting factor for each cooperating interference channel measurement from each cooperating transmitting station, wherein the cooperating weighting factor compensates for a power difference between the CRS and CSI-RS, and
- wherein the cooperating interference measurement module multiplies the cooperating weighting factor by the cooperating interference channel measurement and the summing module adds each cooperating interference channel measurement with the cooperating weighting factor to form a cooperating interference channel measurement sum.

* * * * *